United States Patent [19]

Strybel

[11] Patent Number: 4,458,719

[45] Date of Patent: Jul. 10, 1984

[54] QUICK COUPLER SERVICE FITTING

[75] Inventor: Richard V. Strybel, Elk Grove Village, Ill.

[73] Assignee: Imperial Clevite Inc., Rolling Meadows, Ill.

[21] Appl. No.: 317,161

[22] Filed: Nov. 2, 1981

[51] Int. Cl.³ .............................................. F16L 37/06
[52] U.S. Cl. ........................... 137/614.03; 137/614.04; 251/149.6; 285/320
[58] Field of Search ....................... 137/614.03, 614.04; 285/320; 251/149.6

[56] References Cited

U.S. PATENT DOCUMENTS

| | | | |
|---|---|---|---|
| 748,742 | 1/1904 | Jeffery | 285/320 |
| 2,425,500 | 8/1947 | Wiggins | 137/614.04 |
| 2,511,765 | 6/1950 | Bradbury | 137/614.03 |
| 2,512,999 | 6/1950 | Bruning | 137/614.04 |
| 2,548,528 | 4/1951 | Hansen | 137/614.04 |
| 2,637,572 | 5/1953 | Bruce | 137/614.04 |
| 2,643,140 | 6/1953 | Scheiwer | 285/193 |
| 2,730,380 | 1/1956 | Espy et al. | 137/614.04 |
| 2,868,563 | 1/1959 | Wood | 137/614.04 |
| 2,896,977 | 7/1959 | Hansen | 285/277 |
| 3,076,671 | 2/1963 | Freeman | 285/277 |
| 3,112,767 | 12/1963 | Cator | 137/614.03 |
| 3,120,968 | 2/1964 | Calvin | 285/277 |
| 3,168,335 | 2/1965 | Sumpton | 285/70 |
| 3,174,508 | 3/1965 | Zahuranec | 137/614.04 |
| 3,191,972 | 6/1965 | Collar | 285/93 |
| 3,196,897 | 7/1965 | Hodson | 137/312 |
| 3,851,666 | 12/1974 | Hammond | 137/614.04 |
| 4,068,869 | 1/1978 | Maruyama | 285/316 |

Primary Examiner—A. Michael Chambers
Attorney, Agent, or Firm—Russell E. Baumann

[57] ABSTRACT

A service connection including a first coupler adapter mounted to a service hose end fitting and a second coupler adapter mounted to a service fitting. In the illustrated embodiment, the adapters are threadedly connected to the hose end fitting and service fitting, respectively, and are provided with structure for effecting a quick connection between the adapters and, thus, between the service hose and service fitting. In one embodiment, the hose fitting adapter defines a rectilinear through passage, and in another embodiment, the hose fitting adapter defines a right angle turn flow passage. The hose fitting adapter is provided, in the illustrated embodiment, with a core depressor for engaging an opening in the core valve of the service fitting upon sealed connection of the adapters. The hose fitting adapter may be provided with a shutoff valve which is adapted to be opened by the engagement of the core depressor thereof with the core valve of the service fitting.

8 Claims, 3 Drawing Figures

U.S. Patent  Jul. 10, 1984  4,458,719
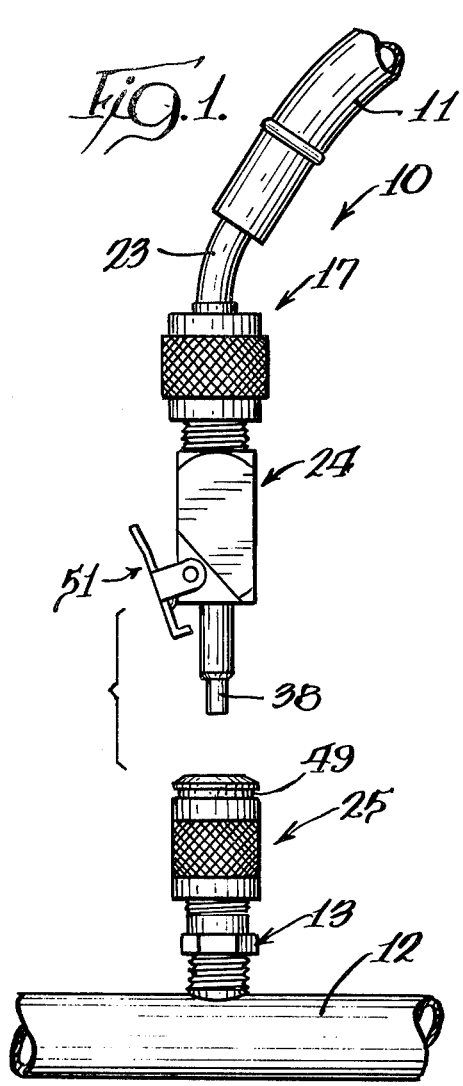
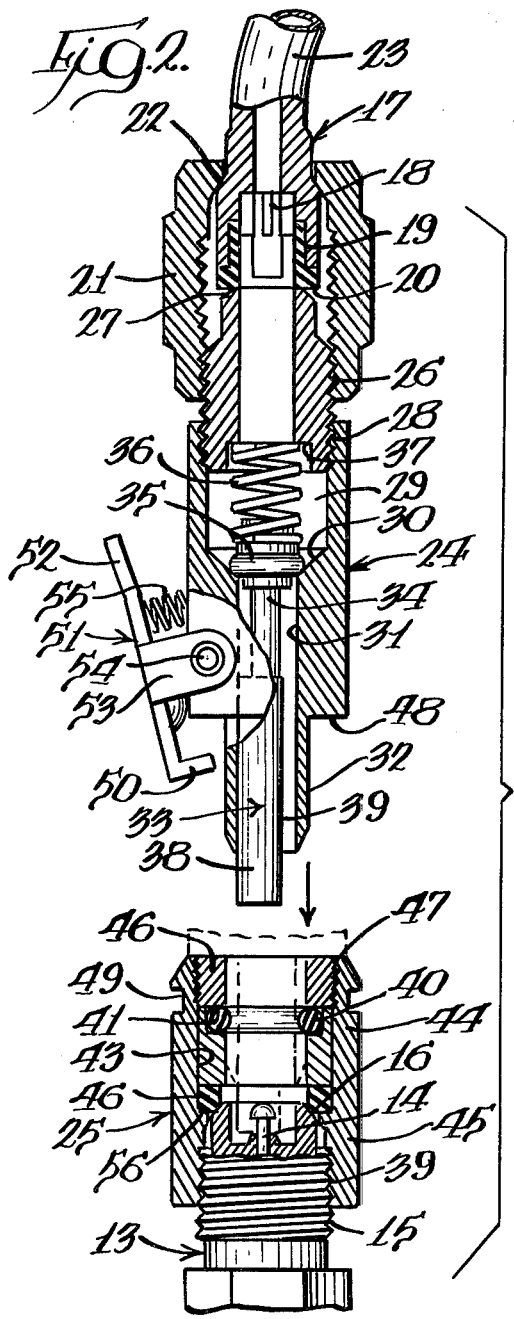
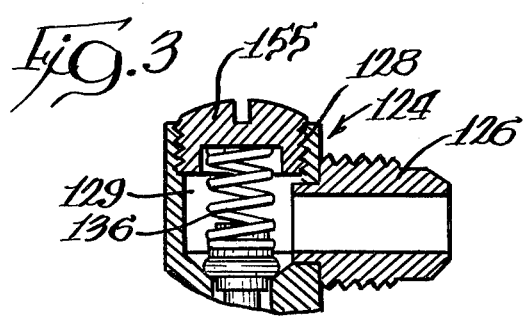

QUICK COUPLER SERVICE FITTING

BACKGROUND OF THE INVENTION

1. Field of the Invention

This invention relates to service fittings.

2. Description of the Background Art

In one form of conventional service fitting, a service hose is connected to a refrigeration air conditioning system through a core valve-type service fitting provided on the system. The conventional connections are effected by threaded means on the hose fitting and service fitting, respectively. A core depressor is provided in the hose end fitting to open the core valve as the fluid connection is being made.

A serious problem arose in such fittings in that because of variability in the positioning of the core valves, the core depressors did not, in all cases, suitably open the core valve when the fittings were connected. To remedy this problem, it has been suggested to provide an adjustable core depressor which is manually adjusted to compensate for variation in the core valve positions. Such adjustment may be effected when necessary, such as when a connection is made without suitably opening the core valve. Obviously, such constant adjustment of the core valve depressor, while solving the original problems, still is not a fully satisfactory answer because of the need for the selective adjustment at times.

Another problem found in the existing service connections arises in the use of the threaded connecting means. Such threaded connecting means do not constitute quick-connect means and commonly refrigerant is lost during the threaded connection between the fittings before the sealed connection is completed.

Another problem arising with the threaded connecting means is the difficulty at times in properly aligning the threads of the stiffness of the hose.

A number of quick-connect couplings have been developed over the years. One such coupling is illustrated in U.S. Pat. No. 3,174,508 of Jerry J. Zahuranec, wherein a double-end shut-off quick-connect tube coupling is provided. The female valve is a ball check valve and is engaged by the stem of the male connector, which is spring-biased. Positive sequential action of the shutoff valve is provided for preventing substantial flow into the coupling until a sealing and locking engagement is assured. A quickconnect retaining means is provided comprising a spring-urged sleeve and ball detent.

Somewhat similar quick-connect couplers are illustrated in R. P. Jacques U.S. Pat. No. 1,383,306 and James R. Johnston U.S. Pat. No. 3,435,848. In the Johnston patent, the quick-connect means comprise springy fingers latched by a slide sleeve.

George F. Hupp shows, in U.S. Pat. No. 3,267,963, a hydraulic coupler wherein two check valves engage each other in the connected arrangement so as to become spaced from their respective seats in the open condition. One of the springs is stronger than the other so as to provide a differential opening action.

SUMMARY OF THE INVENTION

The present invention comprehends an improved fluid transfer connection structure avoiding the disadvantages of the above discussed prior art structures.

In the illustrated embodiment, the fluid transfer connection structure includes male and female adapters mounted one each to the service hose connector and the access fitting of a service connection assembly. The access fitting includes a conventional depressible core valve and, in one form, the service hose connector includes a core depressor for opening the core valve when the service hose fitting is connected mechanically to the service fitting to provide fluid flow communication therebetween.

One adapter element is threadedly mounted to the service hose connector as by threaded means and includes a core depressor. The other adapter element is threadedly mounted to the access fitting.

In the illustrated embodiment, means are provided for effecting a quick mechanical connection of the first adapter to the second adapter, with the core depressor or the first adapter engaging the impressible core valve to open the core valve and provide facilitated sealed fluid transfer connection of the service hose connector to the access fitting.

The first adapter defines a rectilinear through fluid flow passage in one form, and in another form, defines a fluid flow passage having angularly related inlet and outlet ends.

The first adapter may be provided with valve means for selectively closing the end of the service hose prior to the connection thereof to the service fitting. The valve means may be automatically opened as an incident of connection of the adapters.

In the illustrated embodiment, each of the hose end connector means and the first adapter mounted thereto is provided with a core depressor.

The core depressor of the first adapter, in the illustrated embodiment, automatically effects full depression of the core valve of the service fitting, eliminating the need for adjustment of the core depressor, as a result of the spring biasing thereof.

The adapters are threadedly mounted to the hose end connector means and service fitting prior to the interconnection of the adapters to permit facilitated mounting thereof and subsequent ready quick connection therebetween to effectively prevent loss of fluid during the connection of the hose to the service fitting.

The provision of the valve in the hose end adapter provides an automatic shutoff of the hose end, thus permitting discharge of high pressure fluid through a manifold into a system low pressure service fitting.

The improved connection means eliminates hazardous discharge of fluid from the high pressure side of the system during disconnection thereof.

When used in refrigerant charging systems, the improved connecting means simplifies the charging operation and permits introduction of accurately controlled amounts of refrigerant into small systems and the like as substantially all loss of refrigerant during the connection and disconnection is prevented.

By preventing loss of refrigerant during disconnection as in cold environments, injury to the person's hand from the volatile refrigerant is effectively prevented.

By providing the core depressor valve in the hose end adapter, the hoses can be stored under slight pressure, if desired, thereby preventing contamination and the like.

By eliminating the need for a core depressor in the hose end fitting, systems utilizing hand valves, etc., may be serviced more quickly as a result of unrestricted flow.

Thus, the connection means of the present invention is extremely simple and economical of construction, while yet providing highly improved functioning as discussed above.

BRIEF DESCRIPTION OF THE DRAWING

Other features and advantages of the invention will be apparent from the following description taken in connection with the accompanying drawing wherein:

FIG. 1 is a fragmentary elevation of a fluid transfer connection structure embodying the invention;

FIG. 2 is a fragmentary diametric enlarged section thereof; and

FIG. 3 is a fragmentary diametric section of a modified form of hose end adapter embodying the invention.

DESCRIPTION OF THE PREFERRED EMBODIMENT

In the exemplary embodiment of the invention as disclosed in the drawing, a fluid transfer connection structure generally designated 10 is shown to comprise a quick-connect service fitting such as for connecting a hose 11 to a pressure line 12.

The pressure line may be provided with a conventional service fitting 13 having a conventional core valve 14 and peripheral threaded connecting means 15. As shown in FIG. 2, the service fitting further defines a distal seating surface 16.

Hose 11 is provided with a conventional service hose connector fitting 17, which may be provided with a core depressor 18, an annular seal 19, and a distal seating surface 20. A nut 21 is provided with an inturned flange 22 movably retained on a stem portion 23 of the hose fitting.

Nut 21 may be threaded to connecting means 15 of the service fitting 12, with core depressor 18 engaging the core valve 14 to open the core valve as an incident of the threaded connection between the fittings.

As indicated briefly above, the present invention comprehends the provision of means for effecting a quick connection between the hose 11 and pressure line 12 through the fittings 13 and 17. More specifically, the invention comprehends the provision of a first coupler adapter generally designated 24 and a second coupler adapter generally designated 25. As best seen in FIG. 2, adapter 24 includes a male threaded portion 26 adapted to be threadedly connected in threaded nut 21, and defining a seating surface 27 adapted to engage seal 19.

The outer threaded end of the connector 26 is threaded into one end of an adapter body 28. The adapter body defines a spring chamber 29, a frustoconical valve seat 30, and an outer flow passage 31 opening through a tubular nose portion 32.

A core depressor 33 extends coaxially through passage 31 and has its inner end 34 mounted to a movable valve member 35 seating on valve seat 30, as shown in FIG. 2. Valve member 35 is biased against the seat 30 by a coil spring 36 having its inner end seated on a retainer shoulder 37 at the outer end of the connecting element 26.

The outer distal end 38 of the core depressor 33 may define a triangular cross section so as to form with the nose portion 32 a plurality of chordal flow passages 39 in the through passage 31. As seen in FIG. 2, the distal end 38 of the core depressor extends outwardly from nose 32 so as to engage the core valve 14 when the nose 32 is inserted into second coupling adapter 25, as shown in broken lines in FIG. 2.

The second coupling adapter is provided with a threaded outer end 39 threadedly connected to the connecting means 15 of service fitting 13.

An O-ring 40 is provided in radially inwardly opening groove 41 defined by a pair of tubular mounting elements 42 and 43 in the inner distal end 44 of the tubular body 45 of the adapter 25. Inner element 42 is threaded into the end of the body 44 to urge the element 43 outwardly against a sealing ring 46 and thereby urge the sealing ring 46 against a shoulder 56 on body 44. End surface 47 of the service fitting body defines a stop surface adapted to be engaged by a mating stop surface 48 at the inner end of nose 32 of adapter 24. When thus abutted, as shown in broken lines in FIG. 2, core valve 14 is fully opened by the spring-biased depressor 33. However, substantially prior to such opening of the core valve, nose 32 is fully sealed with the O-ring 40 as the nose is substantially fully received in the tubular elements 42 and 43, as shown in broken lines in FIG. 2.

Distal end 44 of the service fitting body 45 further defines a radially outwardly opening groove 49 for coaction with a spring-biased latch finger 50 of a quick-connect device 51. Device 51 further includes a finger manipulating portion 52 and a midportion 53 pivotally mounted to the adapter body 28 by suitable pivot 54. A biasing spring 55 acts between the body 28 and manipulating portion 52 to bias finger 50 inwardly, as illustrated in FIG. 2.

To effect a quick-lock connection of the adapter 24 to the adapter 25, nose 32 is simply inserted into the inner end of the adapter 25 until stop shoulder 48 engages stop shoulder 47, with the finger 50 riding on the end of body 44 into groove 49 and thereby effectively locking the connection of the hose end to the service fitting in a substantially automatic and instantaneous manner.

As seen in FIG. 2, coupler adapter 24 defines an effectively rectilinear through passage for conducting fluid between hose 11 and pressure line 12. In certain installations, it is desirable to have the hose 11 extend transversely to the axis of the service fitting, i.e. generally parallel to the longitudinal extent of the pressure line illustrated in FIG. 1. Thus, as shown in FIG. 3, the coupler adapter 124 may comprise an adapter similar to adapter 24, but having a connecting portion 126 opening laterally into the spring chamber 129. The inner end of the adapter body 128 is closed by a threaded cap 155, which further serves as the spring retainer for the valve biasing spring 136. Thus, hose fitting nut 21 may be connected to element 126 in a manner similar to the connection of hose fitting 17 in the embodiment of FIGS. 1 and 2. In all other respects, the fluid connection system illustrated in FIG. 3 is similar to that of the embodiment of FIGS. 1 and 2, and corresponding parts thereof are identified by similar reference numerals but 100 higher.

Thus, the present invention is advantageously adapted for use as a push-pull quick-connect coupler in a fluid transfer connection system having a core valve-type service fitting such as commonly employed in refrigeration and air conditioning systems.

The foregoing disclosure of specific embodiments is illustrative of the broad inventive concepts comprehended by the invention.

I claim:

1. For use in connecting a first fluid holder such as a service hose having first threaded connector means provided with a first core depressor, said first threaded connector means being permanently connected to said service hose and being arranged to be threadedly connected to a second fluid holder such as a service fitting permanently connected to another element and having a depressible core valve, said service fitting further having a second threaded connector means adapted to be releasably connected to said first threaded connector means to cause said first core depressor to cause said depressible core valve to open and provide controlled fluid flow connection between said hose and service fitting, an improved fluid transfer connection structure comprising:

- a first adapter element having threaded means arranged to be threadedly mounted to the service hose connector threaded connector means and having a second core depressor;
- a second adapter element having threaded means arranged to be threadedly mounted to said service fitting threaded connector means; and
- means provided a quick mechanical connection of said first adapter to said second adapter with said second core depressor extending through said second adapter element for engaging said depressible core valve to open said core valve and provide facilitated sealed fluid transfer connection of said service hose connector to said service fitting.

2. The fluid transfer connection structure of claim 1 wherein said first adapter defines a rectilinear through fluid flow passage.

3. The fluid transfer connection structure of claim 1 wherein said first adapter defines a through fluid flow passage having angularly related inlet and outlet ends.

4. The fluid transfer connection structure of claim 1 wherein said first adapter is provided with valve means for selectively closing one end of said service hose.

5. The fluid transfer connection structure of claim 1 wherein said first adapter is provided with valve means for selectively closing one end of said service hose, said connection structure further including means for opening said valve means as an incident of connection of said first adapter to said second adapter.

6. The fluid transfer connection structure of claim 1 wherein said first threaded connector means is provided with a core depressor for opening said core valve as an incident of threaded connection of said first connector means to said second threaded connector means.

7. The fluid transfer connection structure of claim 1 wherein said first adapter element includes a spring-biased valve and said second core depressor is mounted for movement therewith whereby said core depressor is spring-biased.

8. The fluid transfer connection structure of claim 1 wherein means are provided for sealingly connecting said adapter elements prior to said second core depressor opening said core valve.

* * * * *